United States Patent
DeSantis et al.

(10) Patent No.: US 8,449,768 B2
(45) Date of Patent: May 28, 2013

(54) AUTOMATIC TILTING OIL SKIMMER FRAME

(75) Inventors: Jason DeSantis, Ormond Beach, FL (US); David Aviles, San Juan, PR (US); Lucas Owen, Juno Beach, FL (US); Ernest Nelson Dix Brown, Merritt Island, FL (US)

(73) Assignee: National Response Corporation, Great River, NY (US)

( * ) Notice: Subject to any disclaimer, the term of this patent is extended or adjusted under 35 U.S.C. 154(b) by 265 days.

(21) Appl. No.: 12/900,009

(22) Filed: Oct. 7, 2010

(65) Prior Publication Data

US 2012/0085693 A1    Apr. 12, 2012

(51) Int. Cl.
   *E02B 15/04*    (2006.01)

(52) U.S. Cl.
   USPC .............. 210/170.05; 210/242.1; 210/242.3; 210/923

(58) Field of Classification Search
   USPC ............. 210/167.2, 170.05, 170.09, 170.1, 210/170.11, 242.1, 242.3, 747.6, 776, 923
   See application file for complete search history.

(56) References Cited

U.S. PATENT DOCUMENTS

| | | | | |
|---|---|---|---|---|
| 3,237,774 A | | 3/1966 | Schuback | 210/242 |
| 3,612,280 A | * | 10/1971 | Fitzgerald et al. | 210/242.3 |
| 3,664,505 A | | 5/1972 | Brittingham | 210/242 |
| 3,704,784 A | | 12/1972 | Craggs et al. | 210/242 |
| 3,779,382 A | * | 12/1973 | Steltner | 210/776 |
| 3,923,661 A | | 12/1975 | Crisafulli | 210/242 |
| 3,966,613 A | | 6/1976 | Kirk et al. | 210/242 |
| 3,966,615 A | | 6/1976 | Petchul et al. | 210/242 |
| 4,053,412 A | * | 10/1977 | Stix | 210/167.2 |
| 4,518,495 A | * | 5/1985 | Harding | 210/242.1 |
| 4,551,244 A | | 11/1985 | Inoue | 210/198 |
| 4,610,635 A | | 9/1986 | Austevoll | 441/80 |
| 4,802,592 A | | 2/1989 | Wessels | 210/169 |
| 5,019,277 A | | 5/1991 | Andelin | 210/776 |

(Continued)

FOREIGN PATENT DOCUMENTS

| EP | 0206915 | 12/1986 |
|---|---|---|
| EP | 0514660 | 9/1995 |

(Continued)

OTHER PUBLICATIONS

National Response Corporation, Tar Ball Recovery, PowerPoint presentation, 8 pages, Jul. 17, 2010.

(Continued)

*Primary Examiner* — Christopher Upton
(74) *Attorney, Agent, or Firm* — Sunstein Kann Murphy & Timbers LLP

(57) ABSTRACT

An oil skimmer includes a frame for attaching a porous collection bag. The frame automatically tilts in response to water flow, relative to the frame, and the frame automatically returns to its original ("neutral") position when the water flow ceases. In the tilted position, the frame orients a portion of the mouth of the bag below the surface of the water, so the bag collects floating contaminants. However, in the neutral position, the frame orients the mouth of the bag upward and such that the mouth is above the surface of the water to prevent previously captured contaminants from escaping from the bag and floating away. Optionally, the frame may be releasably locked in the neutral position to facilitate bag replacement or when no collection is desired. The skimmer may be mounted between hulls of a catamaran.

17 Claims, 12 Drawing Sheets

U.S. PATENT DOCUMENTS

| | | | | |
|---|---|---|---|---|
| 5,030,363 | A | 7/1991 | Pole | 210/776 |
| 5,043,060 | A * | 8/1991 | Brennan | 210/242.1 |
| 5,295,453 | A | 3/1994 | Inoue | 114/61 |
| 5,338,464 | A | 8/1994 | Marr | 210/776 |
| 5,685,979 | A | 11/1997 | Governale | 210/242.3 |
| 6,063,274 | A | 5/2000 | Rivera | 210/242.3 |
| 6,471,862 | B1 | 10/2002 | Rockwell | 210/242.3 |
| 6,540,925 | B2 * | 4/2003 | Takahashi et al. | 210/776 |
| 6,793,807 | B2 | 9/2004 | Michel, Jr. | 210/122 |
| 6,962,659 | B2 | 11/2005 | Rhein et al. | 210/242.3 |
| 7,303,688 | B2 | 12/2007 | Pertile et al. | 210/776 |
| 7,357,860 | B1 | 4/2008 | Painter | 210/122 |
| 7,452,462 | B2 | 11/2008 | Joliet | 210/170.05 |
| 2003/0111400 | A1 * | 6/2003 | House | 210/242.3 |

FOREIGN PATENT DOCUMENTS

| | | |
|---|---|---|
| UA | 73576 | 7/2004 |
| WO | WO 8403076 | 8/1984 |
| WO | WO 9631662 | 10/1996 |
| WO | WO 2009122117 | 10/2009 |

OTHER PUBLICATIONS

National Response Corporation, Collection of Heavily Weathered Oil Products, application to Interagency Alternative Technology Assessment Program, 1 page, Jul. 13, 2010.

National Response Corporation, Heavy Oil Recovery Device Product Brochure, 7 pages, Jul. 19, 2010.

Deepwater Horizon Response, Fact Sheet: Skimmers, Joint Information Center, 3 pages, Jun. 23, 2010.

Spill Tactics for Alaska Responders (STAR), Mechanical Recovery Tactics, Marine Recovery, B-89-B-98, 10 pages, Apr. 2006.

ABC Packaging Corporation, ABG Packaging Corporation web page, http://web.archive.org/web/2008510144948/http://www.abgpackaging.com/fibc_bulk-bag . . . ,3 pages, May 10, 2008.

Jennifer Johnson, Restore the Gulf web page, Think Tank Creates the SWORD in Support of the Deepwater Horizon Response, http://www.restorethegulf.gov/release/2010/08/03/think-tank-creates-sword-support-deepwater . . . , 2 pages, Aug. 3, 2010.

Dane Carlson, Window Screens and PVC Oil Spill Cleanup, http://www.business-opportunities.biz/2010/07/22/window-screens-and-pvc-oil-spill-cleanup/, 5 pages, Jul. 22, 2010.

Bob Drogin, A bag and a trap. Oil spill invention is a keeper, Los Angles Times, 6 pages, Jul. 21, 2010.

B.A.G. Corp., The B.A.G. Corp. Super Jack Container Catalog, Product catalog, 19 pages, Feb. 16, 2005.

Robert P. Nesmith, Memorandum: HORD Evaluation, OMC International LLC , 2 pages, Jul. 18, 2010.

Henry Norris, Observations re: TRD, Florida Fish and Wildlife Conservation Commission, 1 page, Jul. 14, 2010.

* cited by examiner

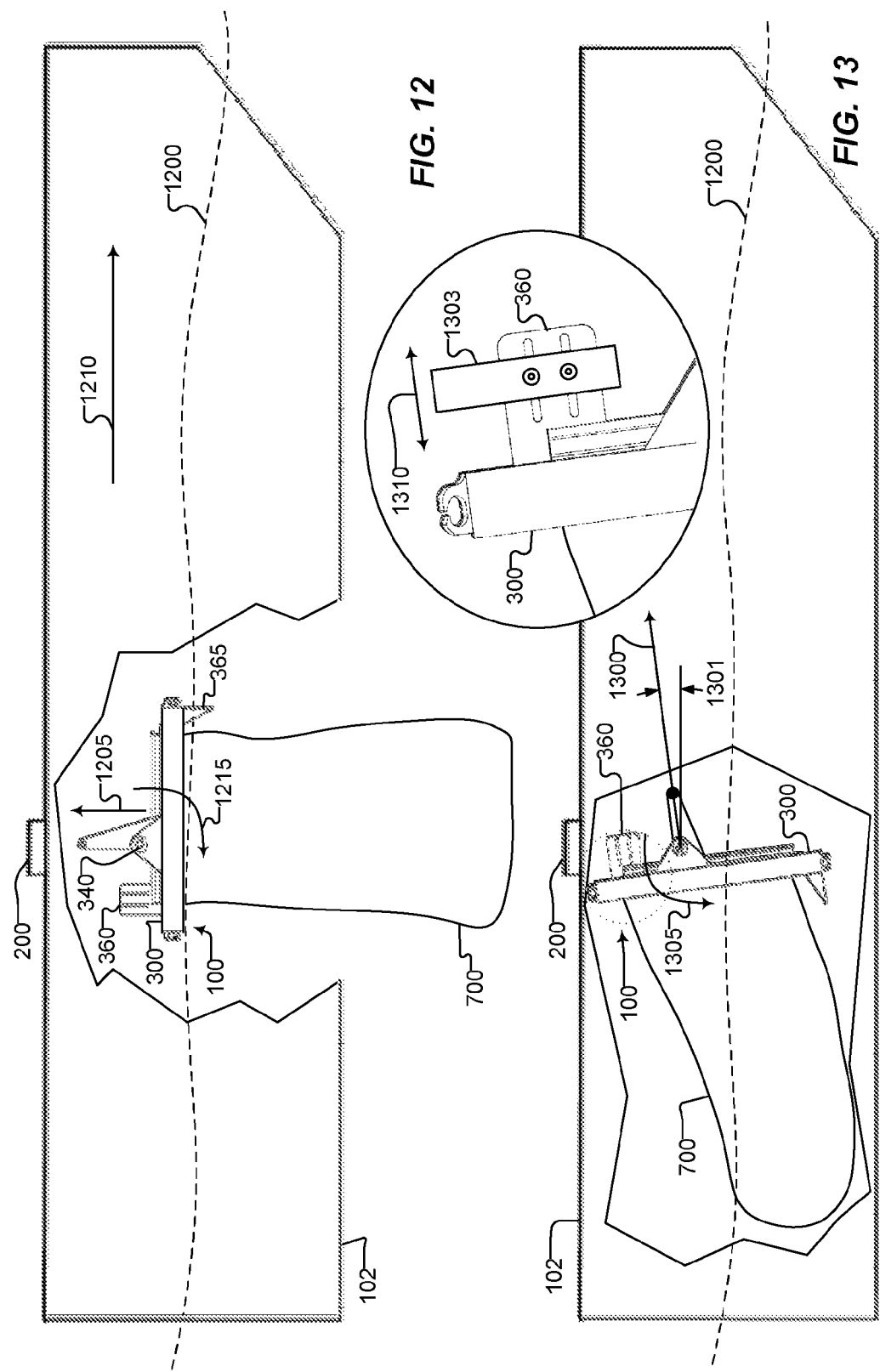

AUTOMATIC TILTING OIL SKIMMER FRAME

TECHNICAL FIELD

The present invention relates to oil skimmers and, more particularly, to oil skimmer frames that automatically tilt, in response to flow of fluid.

BACKGROUND ART

Oil or other contaminants that spill or leak onto waterways or open bodies of water pose well-known ecological and economic problems. Expeditiously and economically cleaning up these contaminants can mitigate or avoid some of these problems.

Prior art systems for skimming oil and other lighter-than-water contaminants include disc oil skimmers, in which a rotating vertically oriented disc is partially submerged in a contaminated liquid, and contaminant that adheres to the rotating disc is wiped off by a doctor blade and collected in a container. The same principle is applied in drum or barrel style oil skimmers. Rope type oil skimmers cycle a loop of absorbent rope over the surface of the contaminated water and wring the contaminant out of the rope into a container. Variations on the rope type oil skimmer use plastic tubing or hose instead of rope and wipe the contaminant from the surface of the cycling tubing or hose. Weir type oil skimmers provide a sump and a weir (dam) that permits only the top layer of liquid (presumably the contaminant) to flow over the weir and be collected in the sump.

Porous bags have also been described for collecting floating contaminants. For example, U.S. Pat. No. 4,551,244 to Junichi Inoue discloses a two-hulled catamaran with a gun at the bow to sprays a gelling agent onto floating oil in front of the catamaran. A cage, disposed between the two hulls, houses a porous collection bag whose open side is directed toward the bow to collect gelled oil.

Prior art oil skimmer apparatus is, however, inadequate, particularly in situations where a vessel containing a skimmer needs to maneuver in an out of locations, such as coves.

SUMMARY OF EMBODIMENTS

An embodiment of the present invention provides a tilting skimmer for use with a collection bag. The collection bag defines a mouth configured to collect liquid borne material. The mouth of the bag has a perimeter. The liquid has a surface. The tilting skimmer includes a pivot and a frame. The frame is configured to detachably receive the collection bag and orient the mouth of the collection bag consistent with the orientation of the frame. The frame is also configured to rotate about the pivot, at least between a first (neutral) orientation and a second (collecting) orientation. In the first orientation of the frame, the perimeter of the mouth of the collection bag is above the surface of the liquid. In the second orientation of the frame, the mouth of the collection bag is bisected by the surface of the liquid.

Optionally, a dam may be attached to the frame. Such a dam is configured to extend at least partially into the liquid when the frame is in the first orientation. Flow of the liquid, relative to the frame and against the dam, urges the frame toward the second orientation.

Optionally, a counterweight may be attached to the frame and configured to urge the frame toward the first (neutral) orientation. The counterweight may be adjustable. The counterweight may include a mass, a mechanical spring, a gas spring or any combination thereof.

The skimmer may also include a stop configured to prevent rotation of the frame about the pivot beyond the second orientation.

The skimmer may include a releasable lock configured to selectively prevent rotation of the frame about the pivot away from the first orientation. For example, such a lock may be used to lock the frame to facilitate changing the collection bag.

Optionally, the first (neutral) orientation comprises a plurality of predefined first orientations of the frame. In this case, the releasable lock may be configured to selectively prevent rotation of the frame about the pivot away from a selected one of the plurality of predefined first orientations of the frame. The dam may be configured to extend at least partially into the liquid when the frame is in at least one of the plurality of predefined first orientation. When the dam is in such a position, flow of the liquid, relative to the frame and against the dam, urges the frame toward the second orientation. In at least a different one of the plurality of predefined first orientations of the frame, the frame may be oriented such that the dam is out of the liquid.

The frame may include a neck extending proud of the frame. The collection bag may be attached to the frame, via the neck.

The frame may be configured to detachably receive at least two collection bags and orient respective mouths of the received at least two collection bags in parallel.

The skimmer may include at least two spaced-apart floats, such as in the form of a catamaran. The frame may be disposed between the floats, and the frame may be coupled to at least one of the floats. The frame and the pivot may be configured such that the frame rotates about the pivot, relative to the floats. The frame may be releasably coupled to the at least one of the floats.

Another embodiment of the present invention provides a tilting skimmer for use with a collection bag. The collection bag defines a mouth configured to collect liquid borne material. The tilting skimmer includes a pivot and a frame. The frame is configured to detachably receive the collection bag and orient the mouth of the collection bag consistent with orientation of the frame. The frame is also configured to rotate about the pivot at least between a first (neutral) orientation and a second (collecting) orientation. In the first orientation of the frame, the mouth of the collection bag is directed upward, within an angle of about 45 degrees of vertical. In the second orientation of the frame, the mouth of the collection bag is directed sideways, within an angle of about 45 degrees of horizontal.

The mouth of the collection bag has a perimeter, and the liquid has a surface. The frame and the pivot are configured such that, in the first orientation of the frame, the perimeter of the mouth of the collection bag is above the surface of the liquid. The frame and the pivot are also configured such that, in the second orientation of the frame, the mouth of the collection bag is bisected by the surface of the liquid.

BRIEF DESCRIPTION OF THE DRAWINGS

The invention will be more fully understood by referring to the following Detailed Description of Specific Embodiments in conjunction with the Drawings, of which:

FIG. 12 a cut-away side view of the catamaran of FIG. 11, with the frame shown in the neutral position;

FIG. 13 a cut-away side view of the catamaran of FIG. 11, with the frame shown in the collecting position;

DETAILED DESCRIPTION OF SPECIFIC EMBODIMENTS

Embodiments of the present invention include a frame to which a porous collection bag may be easily attached or removed. The frame automatically tilts in response to water flowing relative to the frame, and the frame automatically returns to its original ("neutral" or "holding") position when the water ceases flowing or the flow rate falls below a predetermined value. In the tilted (water flowing or "collecting") position, the frame orients a portion of the mouth of the bag below the surface of the water, so the bag collects floating contaminants. However, in the neutral frame position, the frame orients the mouth of the bag upward and such that the mouth is entirely above the surface of the water to prevent previously captured contaminants from escaping from the bag and floating away. In addition, when the frame is in the neutral position, the bag may be easily removed from the frame and a fresh bag may be easily attached to the frame. Optionally, the frame may be releasably locked in the neutral position to facilitate bag replacement or when no collection is desired.

In some embodiments, the automatic tilting frame is disposed between two hulls of a catamaran, such that in the tilted (collecting) position of the frame, the mouth of the bag is directed toward the bow of the catamaran. In such embodiments, the frame automatically switches the bag into the collecting orientation when the catamaran moves forward, relative to the water, and the frame automatically switches the bag into the neutral orientation when the catamaran stops or moves backwards. Thus, the frame automatically switches between the collecting and holding orientations as the catamaran is maneuvered, such as in and out of coves.

Once a collection bag becomes full, the frame may be manually or automatically tilted to the neutral position and the bag may be closed, such as with a drawstring (as described below). The bag may then be detached from the frame and allowed to float out the back end of the catamaran and then secured to a hook on the side or back of the catamaran or left floating for later pickup by a collection vessel.

In other embodiments, the automatic tilting frame is attached to fixed supports, such as posts set in the bed of a stream, river or tidal basin, and the frame automatically tilts in response to water flow. In such embodiments, the frame automatically orients the bag to collect contaminants when water is flowing past the frame, and the frame automatically tilts the bag upward when no, or insufficient, water is flowing. In some such embodiments, the frame can tilt in two opposite directions, relative to the neutral position, to enable the bag to collect contaminants while tidal waters flow in or out during tide changes.

In yet other embodiments, the automatic tilting frame is suspended by a crane extending over the side of a ship, so the device collects contaminants along a path roughly parallel to the path of the ship.

Figure 1:
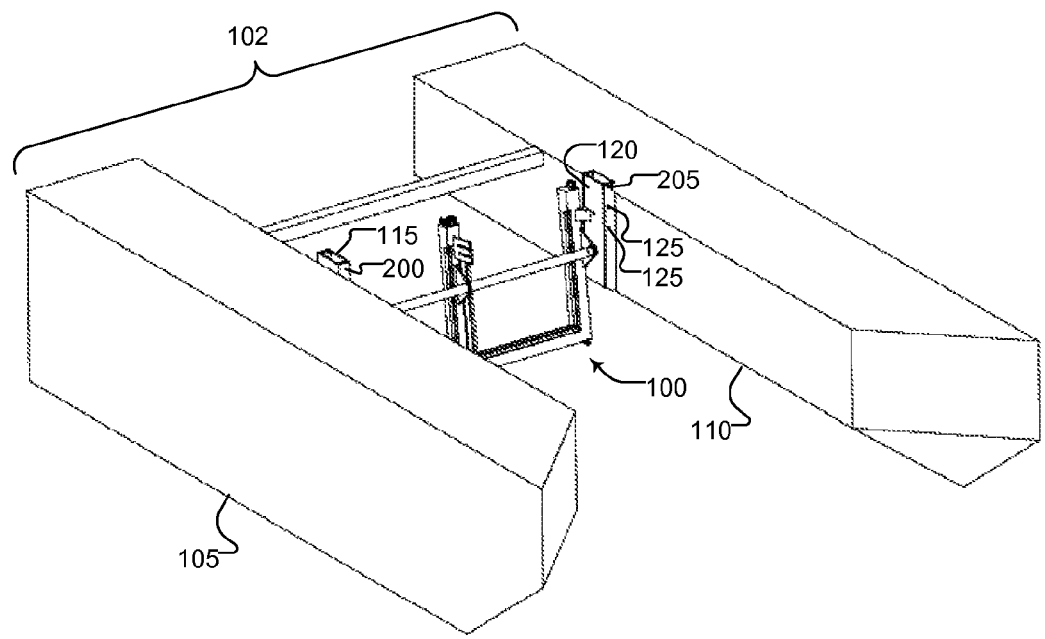
FIG. 1 is a perspective schematic illustration of an automatic tilting frame assembly attached to a catamaran, according to an embodiment of the present invention.
Figure 2:
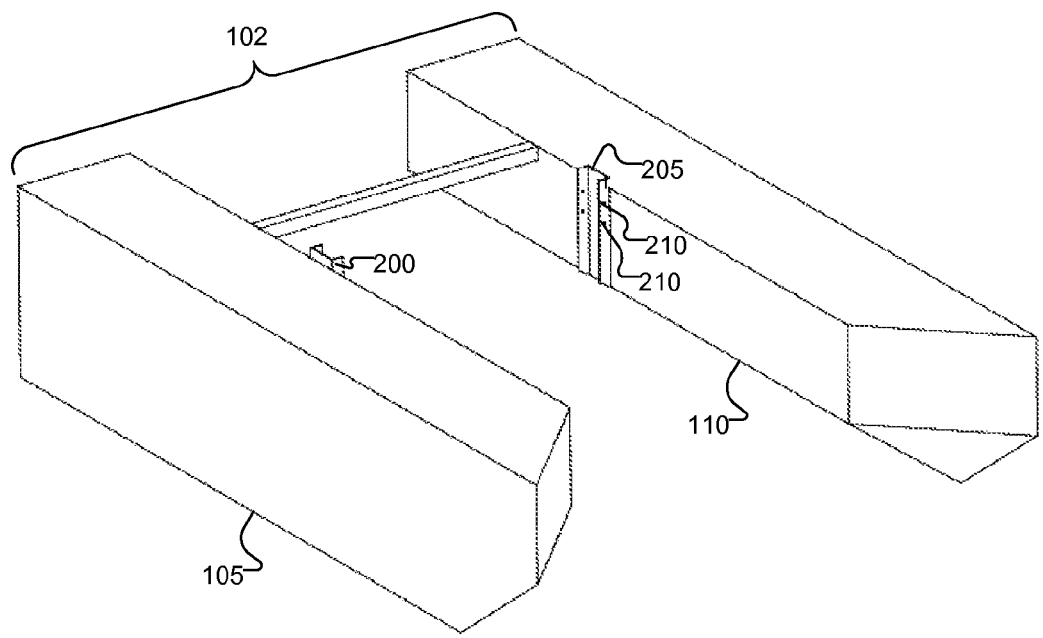
FIG. 2 is a perspective schematic illustration of the catamaran of FIG. 1, with the frame assembly removed.

FIG. 1 is a perspective schematic illustration of one embodiment of the present invention. An automatic tilting frame assembly 100 is removably attached to a catamaran 102. The catamaran 102 includes two hulls 105 and 110. FIG. 2 is a perspective schematic illustration of the catamaran 102, with the frame assembly 100 removed. As shown in FIG. 2, two counterfacing U-shaped channels 200 and 205 are attached to the catamaran hulls 105 and 110. Each of the channels 200 and 205 defines a set of holes 210 for fixing the frame assembly 100, as explained below. Returning to FIG. 1, the frame assembly 100 includes complementary U-shaped channels 115 and 120 that can be vertically received within the U-shaped channels 200 and 205 of the catamaran 102, and pins 125 may be inserted through the holes 210 and holes (not visible) in the U-shaped channels 115 and 120 of the frame assembly 100 to releasably lock the frame assembly 100 in place. Thus, the frame assembly 100 constitutes a removable unit. In other embodiments, the frame assembly 100 is non-removably attached to the catamaran 102.

Figure 3:
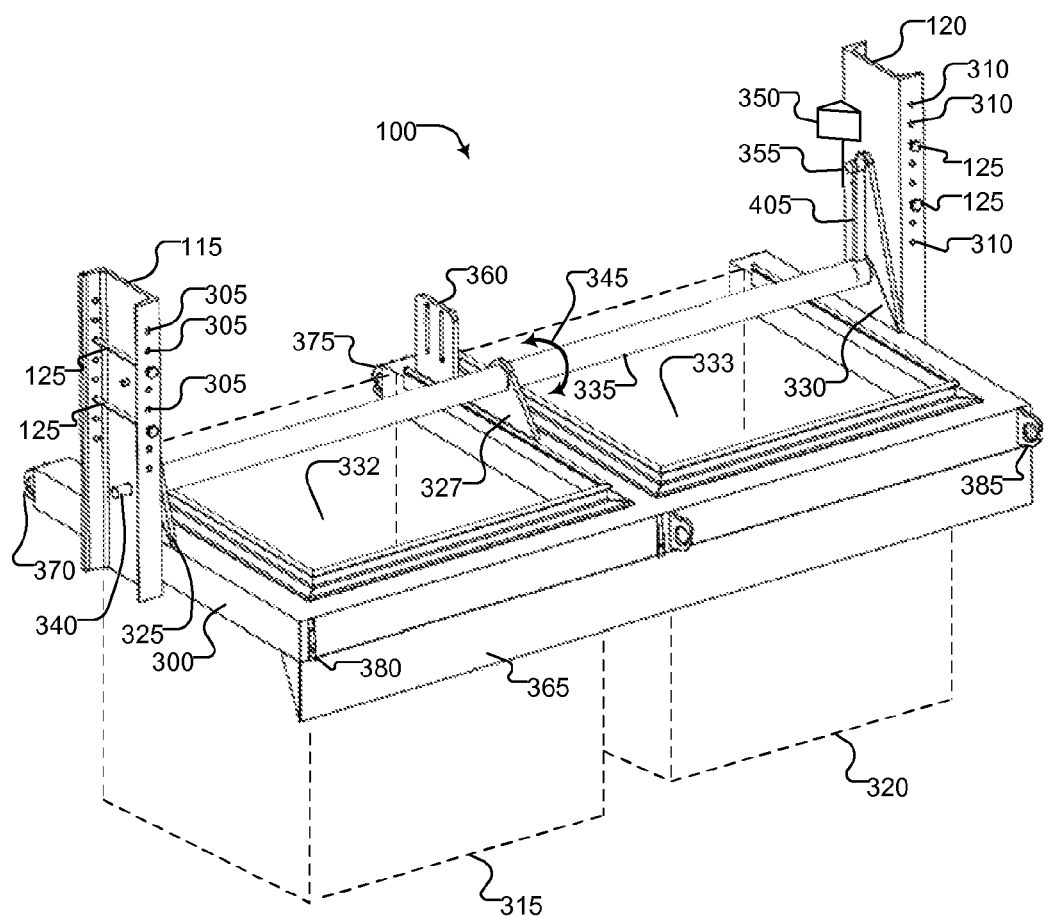
FIG. 3 is a perspective schematic illustration of the frame assembly of FIG. 1, with a frame shown in a neutral (unfilled) orientation.

FIG. 3 is a perspective schematic illustration of the frame assembly 100, with a frame 300 shown in the neutral (holding) orientation. The U-shaped channels 115 and 120 of the frame assembly 100 define holes 305 and 310, through which the pins 125 may be inserted to releasably lock the frame assembly 100 at one of several vertical positions, such as relative to the U-shaped channels 200 and 205 of the catamaran 102. Thus, the height of the frame assembly 100 may be adjusted, relative to the surface of the water on which the catamaran 102 floats.

The frame assembly 100 is configured to support two collection bags (shown in phantom at 315 and 320). However, other embodiments, according to the present disclosure, may support other numbers of collection bags. The frame assembly 100 includes a generally E-shaped (for two collection bags) frame 300 that defines two openings 332 and 333, each opening configured to receive a collection bag.

The frame 300 is attached via three brackets 325, 327 and 330 to a tube or rod 335. A portion (exemplified by portion 340) of each end of the tube or rod 335 extends through a corresponding hole in the corresponding U-shaped channel 115 or 120, so the frame 300 can pivot about the axis of the tube or rod 335, as indicated by two-headed arrow 345. The tube or rod 335 therefore provides a pivot for the frame 300. A stop 350 is attached to one of the U-shaped channels 120 to prevent the frame 300 from pivoting beyond the collecting orientation. No stop is necessary, although optionally one may be provided, to prevent the frame 300 from pivoting in the other direction beyond the neutral orientation.

Figure 4:
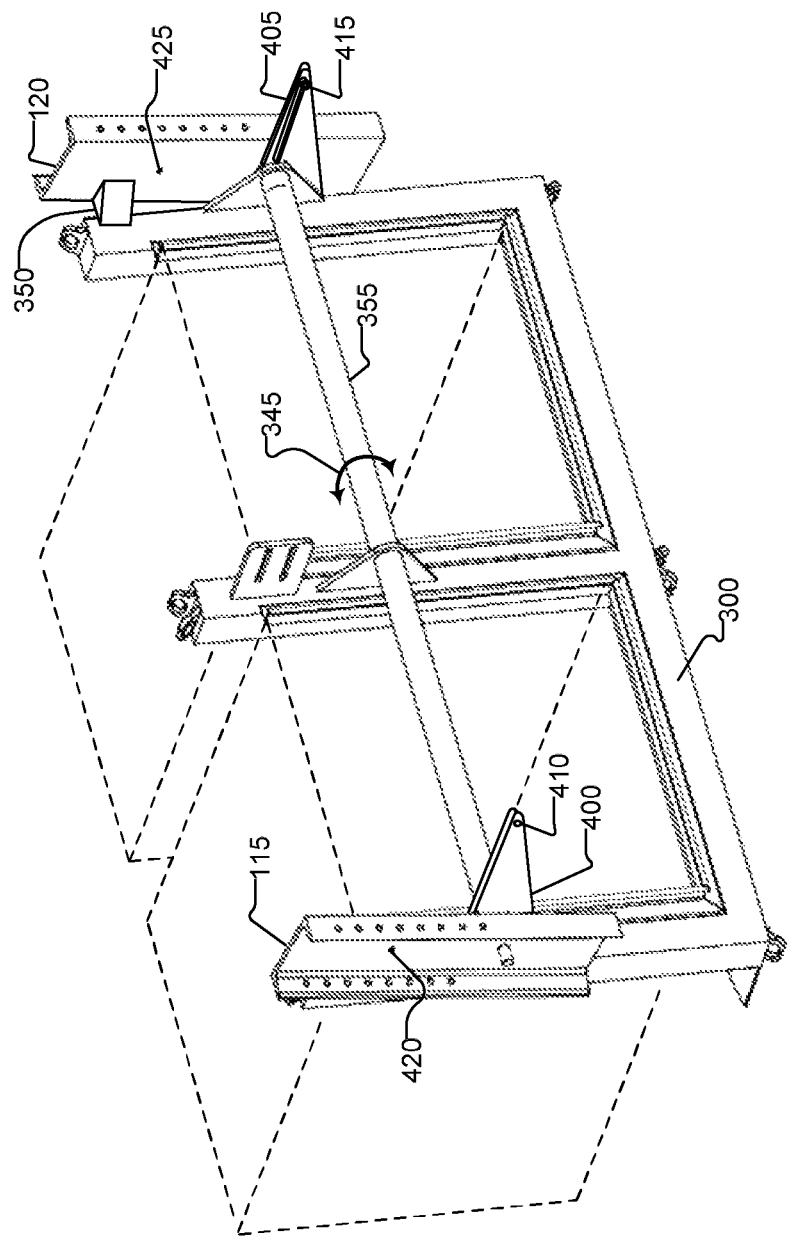
FIG. 4 is a perspective schematic illustration of the frame assembly of FIG. 1, with the frame shown in a collecting (tilted) orientation.

FIG. 4 is a perspective schematic illustration of the frame assembly 100, with the frame 300 shown in the collecting (tilted) orientation. Note that the frame 300 has been prevented from pivoting further than the stop 350. Arms 400 and 405 are attached to the rod or tube 355 for rotation with the frame 300. Each arm 400 and 405 defines a respective hole 410 and 415. The U-shaped channels 115 and 120 define holes 420 and 425 that may be used, together with the holes 410 and 415, to releasably lock the frame 300 in the neutral position, as described below.

Returning to FIG. 3, the frame 300 may be releasably locked in the neutral position by inserting pins, exemplified by pin 355, through the holes 410 and 415 (FIG. 4) in the arms 400 and 405 and through the holes 420 and 425 in the U-shaped channels 115 and 120. Also visible in FIG. 3 is a counterweight attachment plate 360, a dam 365 and bag attachment hooks (exemplified by hooks 370, 375, 380 and 385). These items are described below.

Figure 5:
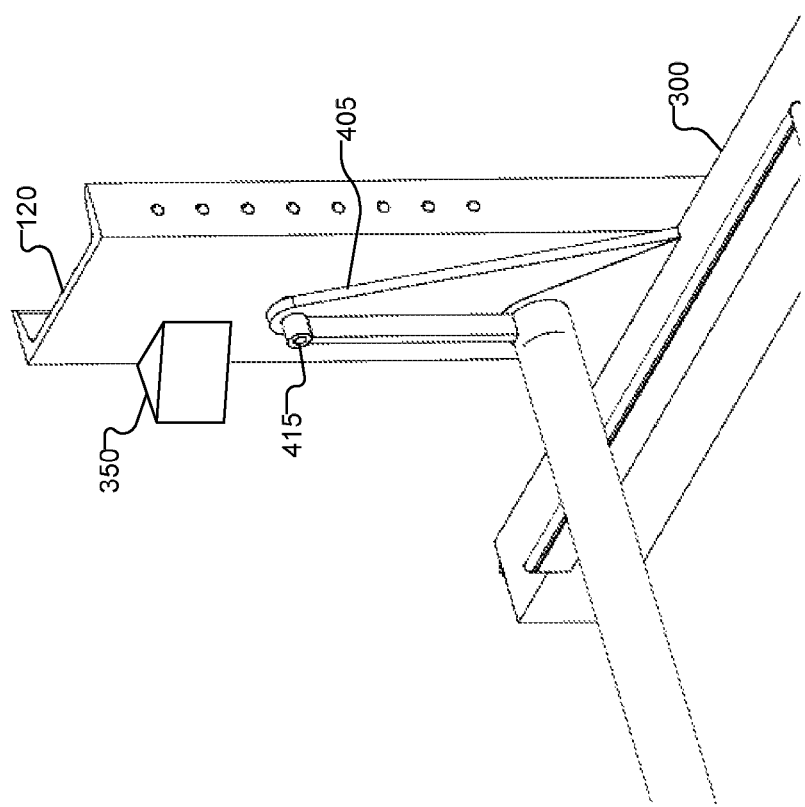
FIG. 5 is a close-up perspective schematic illustration of a U-shaped channel, an arm and a portion of the frame of the frame assembly of FIG. 1, according to respective embodiments of the present invention.

FIG. 5 is a close-up perspective schematic illustration of the U-shaped channel 120, the arm 405 and a portion of the frame 300. As noted, a pin 355 (FIG. 3, not shown in FIG. 5) may be inserted through the hole 415 in the arm 405 and the hole 425 (not visible in FIG. 5) in the U-shaped channel 120 to releasably lock the frame 300 in the neutral position.

Figure 6:
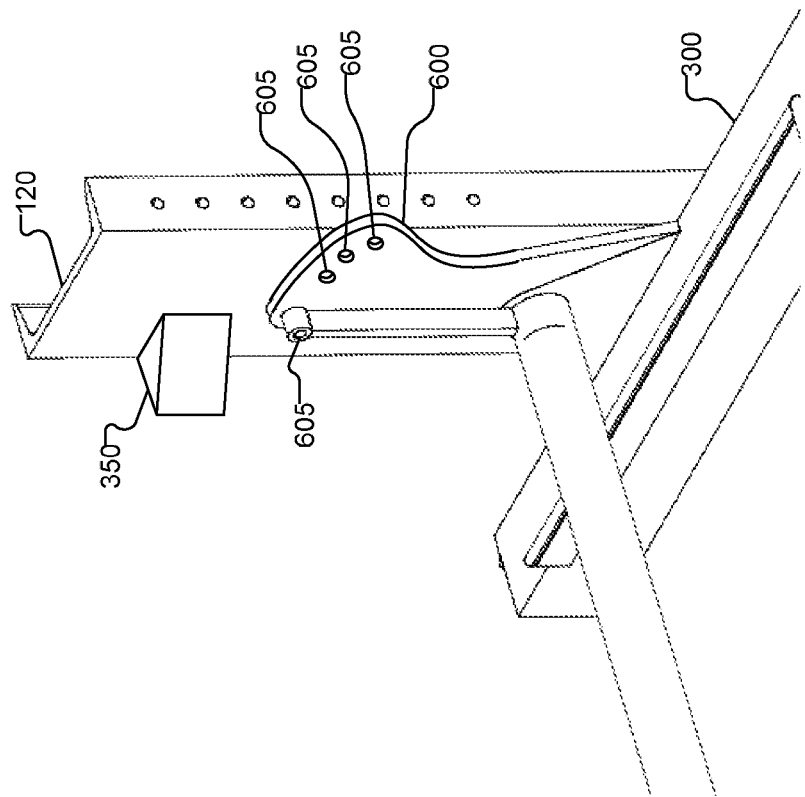
FIG. 6 is a close-up perspective schematic illustration of an alternative embodiment of an arm of the frame assembly of FIG. 1, according to an embodiment of the present invention.

FIG. 6 is a close-up perspective schematic illustration of an alternative embodiment of an arm 600 attached to the frame 300 for rotation with the frame 300. The alternative arm 600 includes a plurality of holes 605 arranged along an arc, so the frame 300 may be releasably locked in a selected one of several neutral positions. In some embodiments, one or more of these neutral positions orient the mouth of the collection bag slightly towards the rear or slightly towards the front of the catamaran 102 (not shown). One or more of these orientations may be found to be advantageous when moving the catamaran 102 on water, without collecting material. In some embodiments, one or more of these neutral positions orient the frame 300 so the dam 365 (explained below) does not extend into the water, so as not to impede movement of the catamaran 102. One or more of these orientations may facilitate installing or removing the collection bags.

Figure 7:
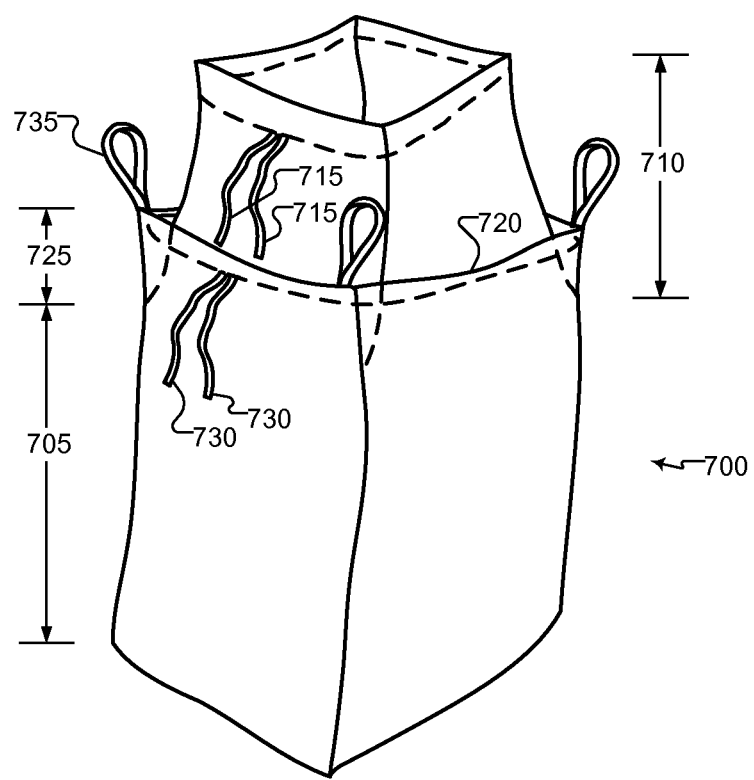
FIG. 7 is a perspective schematic illustration of a collection bag that may be used with the automatic tilting frame assembly of FIG. 1, according to an embodiment of the present invention.

FIG. 7 is a perspective schematic illustration of a collection bag 700 that may be used with an automatic tilting frame 300, according to the present disclosure. The bag 700 includes a main portion 705 and a duffle portion 710. The duffle portion 710 includes a duffle drawstring 715. A sleeve may extend around the circumference of the duffle portion 710, and the drawstring 715 may be threaded through the sleeve. Ends of the drawstring 715 may extend through holes in the duffle portion or grommets installed in such holes. The collection bag 700 may be closed by tightening the duffle drawstring 715, thereby preventing collected material from flowing out of the collection bag 700, before the bag 700 is disconnected from the frame 300.

The main portion 705 of the bag 700 includes a mouth 720. It should be noted that the duffle portion 710 attaches inside the main portion 705, several inches inside the mouth 720, thereby leaving a lip portion 725 surrounding the duffle portion 710. The lip portion 725 includes a cinching drawstring 730, which may be threaded through its own sleeve. The bag 700 may be attached to the frame 300 via the lip portion 725, as described below.

Optionally, straps (exemplified by strap 735) may be included at corners of the mouth 720. Although a generally rectangular bag 700 is shown, other shapes may be used. The drawstrings 715 and 730 and the straps 735 (if included) should be made of cotton, rather than plastic, to prevent slipping of knots used to tie the drawstrings and/or straps.

In one embodiment of the bag 700, the mouth 720 dimensions are about 35 inches by about 35 inches, and components of the frame 300 are correspondingly sized. Our experiments indicate the bag depth should be significantly larger than the mouth dimension to prevent "sloshing" when the bag is in use. For a mouth dimension of about 35 inches, a bag depth of about 81 inches has been found to yield satisfactory results.

At least a portion of the main portion 705 of the bag 700 should be porous, so as to be water-permeable, yet relatively impervious to the material to be collected in the bag 700. For example, the weave of the bag 700 should be loose enough to permit water to pass relatively freely through openings in the weave, yet tight enough to prevent escape of the collected material. A dewatering bag specified to retain the collected material may be used. Optionally, the bag 700 may be made of, or the inside of the bag 700 may be coated with, a material, such as an oleophobic material, that prevents or inhibits escape of the collected material. Optionally, the inside of the bag 700 may be lined with sorbent material (not shown) to prevent release of material from the bag 700, which might otherwise form a sheen on the surface of the water.

The collection bag 700 may be woven from polyester, polypropylene or another suitable material. As noted, the weave should be sufficiently open to be water permeable, yet sufficiently closed to prevent collected material from passing through the weave. For collecting tar balls, our experiments indicate a weave of about 9×12 threads per inch, fabricated from about 3 oz. vinyl coated polyester material, is satisfactory. The material should be treated to retard degradation from ultraviolet (UV) radiation, such as sunlight.

Using the bag requirements described herein, suitable collection bags may be specified and obtained from B.A.G. Corp., 11510 data Drive, Dallas, Tex. 75218, such as Flexible Intermediate Bulk Container (FIBC) bags from the Super Sack® line of container bags, or from ABG Packaging Corporation, 1925 Elmwood Road, Rockford, Ill. 61103.

Figure 8:
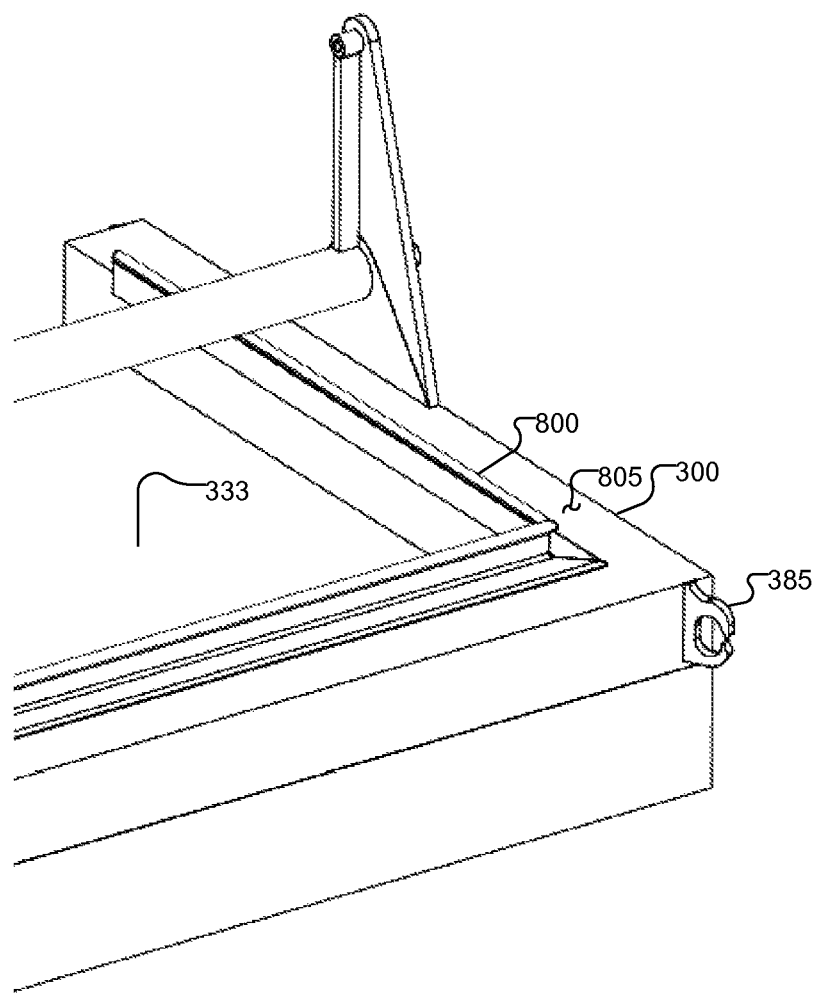
FIG. 8 is a close-up perspective schematic illustration of a neck portion of the frame of FIG. 1, according to an embodiment of the present invention.

FIG. 8 is a close-up perspective schematic illustration of a portion of the frame 300, in particular, a neck 800 that extends proud of the surface 805 of the frame 300. The neck 800 facilitates attaching a collection bag (not shown) to the frame 300, as described below. In the embodiment shown in FIG. 8, the neck 800 extends around three sides of the opening 333 defined by the frame 300. Another neck (not visible in FIG. 8) extends around three sides of the other opening 332 (not visible in FIG. 8) defined by the frame 300. In some other embodiments, the neck 800 extends around more or fewer than three sides of each opening 333 and 332.

Figure 9:
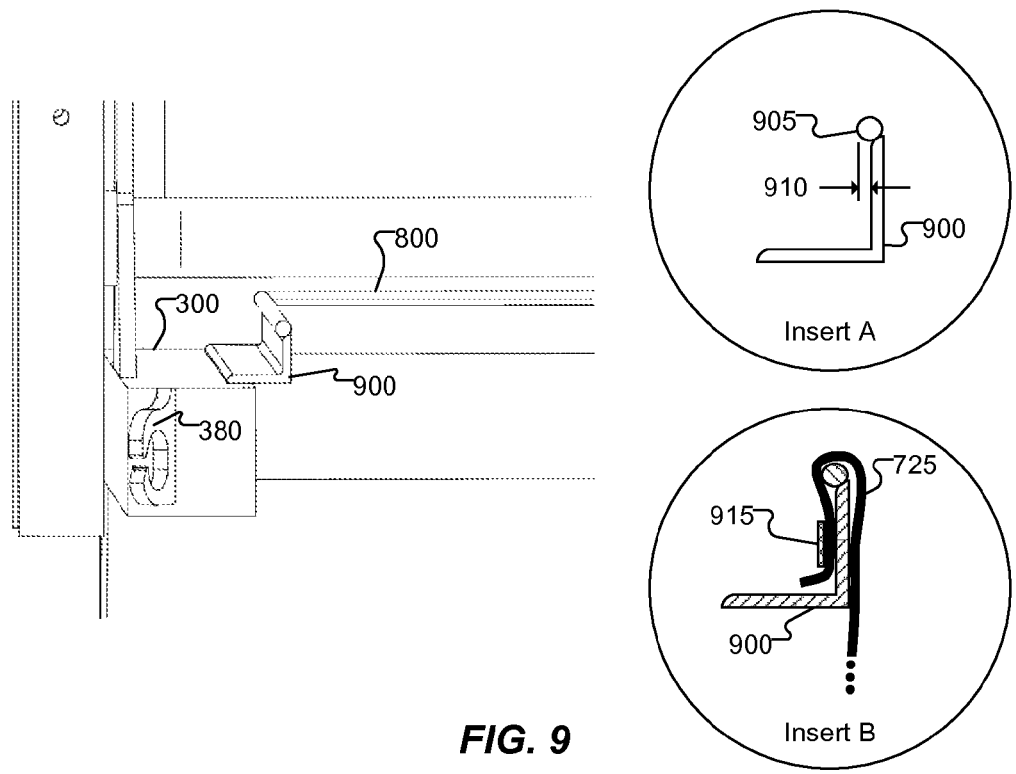
FIG. 9 is a close-up perspective schematic illustration of a portion of the neck of FIG. 8.

FIG. 9 is a close-up perspective schematic illustration of the frame 300 showing the neck 800 in more detail. As shown in Insert A, in one embodiment, the neck 800 includes an L-shaped bracket 900 and a round rod 905 attached to the top edge of the L-shaped bracket 900. The rod 905 should be sized and attached to provide an overhang 910. As shown in Insert B, the lip portion 725 (FIG. 7) of the bag wraps around the vertical portion of the L-shaped bracket 900, and the cinching drawstring 730 or a separate strap 915 may be tightened to secure the bag to the neck 800.

Optionally or alternatively, the straps 735 (FIG. 7) of the collection bag 700 may be tied to bag attachment hooks, such as hook 380. In this case, the cinching drawstring 730 or separate strap 915 is optional.

Figure 10:
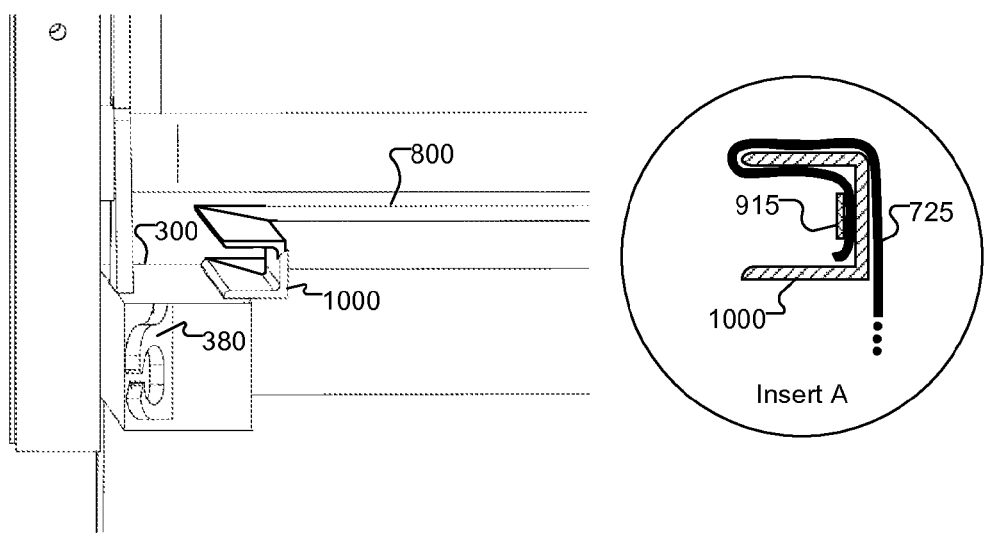
FIG. 10 is a close-up perspective schematic illustration of an alternative neck portion of the frame of FIG. 1, according to another embodiment of the present invention.

FIG. 10 is a close-up perspective schematic illustration of the frame 300 showing an alternative neck embodiment 1000. The alternative neck 1000 includes a generally U-shaped channel. As shown in Insert A, the lip portion 725 (FIG. 7) of the bag wraps around the vertical and the top horizontal portions of the U-shaped channel. Our experiments indicate that the alternative neck 1000 provides a more secure bag attachment than the neck 800 shown in FIG. 8.

Figure 11:
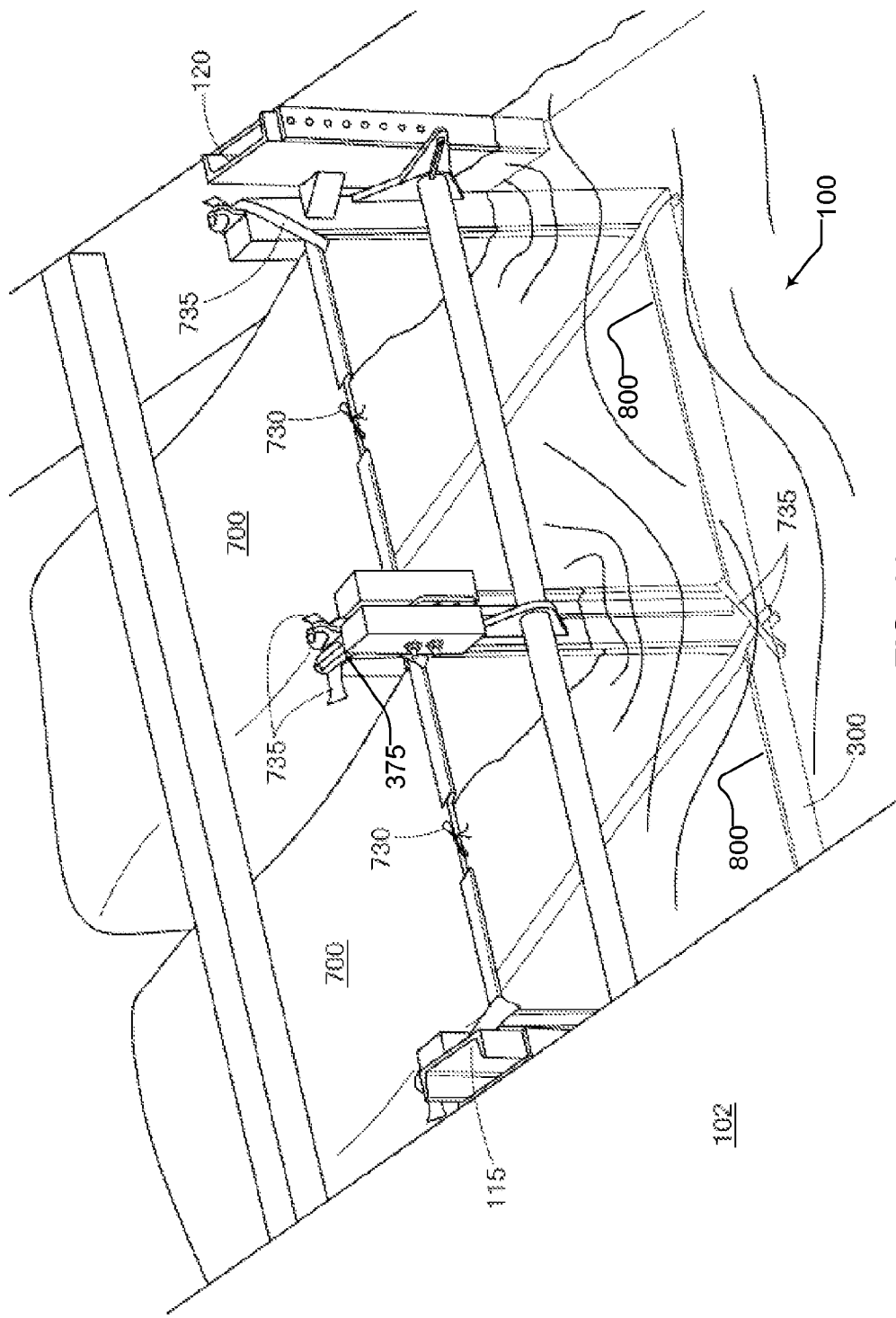
FIG. 11 is a close-up perspective schematic illustration of the frame assembly of FIG. 1 installed in a catamaran, with two collection bags of FIG. 7 attached to the frame assembly.

FIG. 11 is a close-up perspective schematic illustration of the frame assembly 100 installed in a catamaran 102, with collection bags 700 attached to the frame assembly 100. The frame 300 is in the collecting position. The bags 700 are shown attached to the frame 300 by straps 735 tied to hooks (exemplified by hook 375) on the frame 300, as well as being secured to the necks 800 of the frame 300. However, as noted, either attachment technique may be used alone.

As noted, the frame 300 automatically tilts into the collecting position in response to water flowing past the frame 300, and the frame 300 automatically returns to its original (neutral) position when the water ceases flowing or the flow rate falls below a predetermined value. FIG. 3 illustrates aspects of the frame 300 that implement this automation. The dam 365 extends from the frame 300 a vertical distance sufficient to place at least a portion of the dam 365 in the water when the frame 300 is in the neutral position. This is illustrated in FIG. 12, which is a cut-away side view of the catamaran 102, with the frame 300 in the neutral position. Dashed line 1200 represents the water's surface. As noted, in the neutral position, the frame 300 orients the collection bag 700 so the mouth of the bag is directed approximately upward, as indicated by arrow 1205, and the perimeter of the mouth of the collection bag 700 is above the surface 1200 of the water. "Approximately upward" means the mouth of the collection bag 700 may be directed as much as some tens of degrees away from perpendicular to the surface 1200 of the water. In one embodiment, the mouth of the collection bag 700 is directed upward within an angle of about 45° of vertical.

The frame assembly 100 is attached within the U-shaped channels 200 and 205 (FIG. 2) of the catamaran 102, using appropriate ones of the holes 305 and 310 (FIG. 3), such that at least a portion of the dam 365 extends below the water line 1200, when the frame 300 is in the neutral position.

Recall that a portion 340 of the tube or rod 335 (FIG. 3) extends through the U-shaped channel 115 to permit the frame 300 to pivot about the axis of the tube or rod 335. Returning to FIG. 12, if the catamaran 102 moves in the direction of arrow 1210 (or water flows in the opposite direction, relative to the catamaran 102), water pressure on the dam 365 urges the frame 300 to pivot about the portion 340, as indicated by arrow 1215, thereby dipping the mouth of the bag 700 into the water. Water begins flowing into the bag 700 and inflates the bag 700. Water pressure in the bag 700 urges the frame 300 to continue pivoting, until the stop 350 (FIG. 3) prevents the frame 300 from pivoting further, i.e., until the frame 300 reaches the full collecting position.

FIG. 13 is a cut-away side view of the catamaran 102, with the frame 300 in the collecting position. When the frame 300 is in the collecting position, the mouth of the bag 700 is bisected by the surface 1200 of the water. "Bisected" means divided into two (not necessarily equal) portions. In the collecting position, the mouth of the bag is directed sideways, as indicated by arrow 1300, approximately parallel to the surface 1200 of the water. "Approximately parallel to the surface of the water" means the mouth of the collection bag 700 may be directed at an angle of as much as some tens of degrees above or below the surface 1200 of the water, as long as the direction 1300 is distinct from "approximately upward," as defined above. In one embodiment, the mouth of the collection bag 700 is directed sideways, within an angle of about 45° of horizontal.

Figure 15:
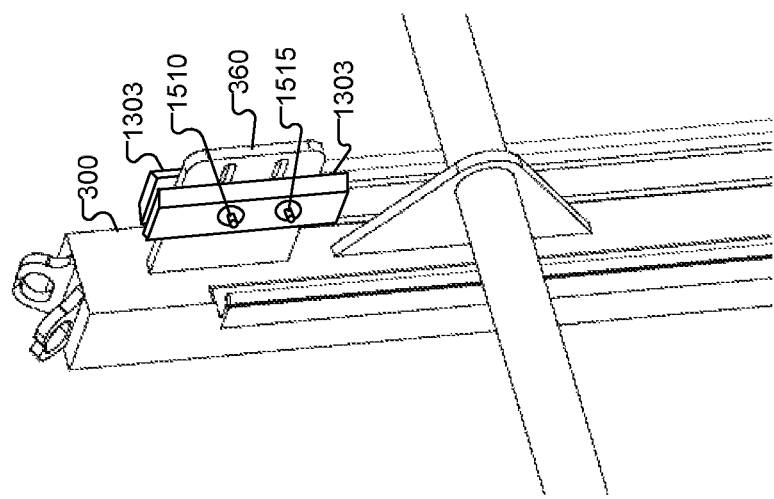
FIG. 15 is a close-up perspective schematic illustration of a counterweight attachment plate of FIG. 14, with counterweights attached thereto.
Figure 14:
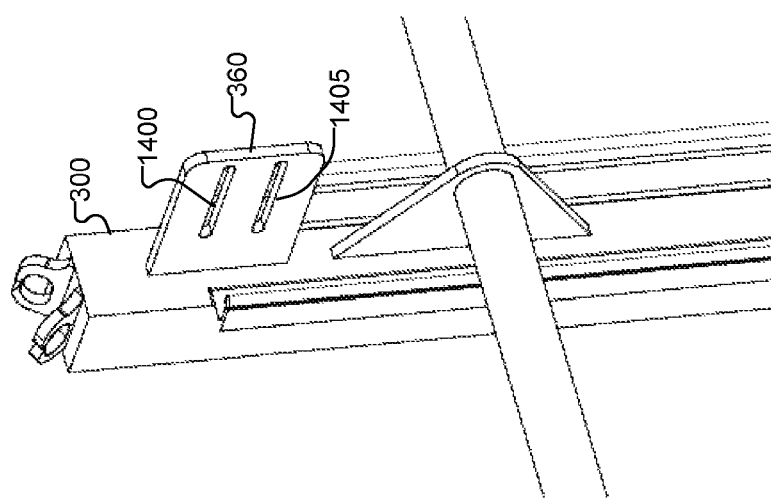
FIG. 14 is a close-up perspective schematic illustration of a counterweight attachment plate of the frame assembly of FIG. 1, according to an embodiment of the present invention.

Counterweights 1303 (see Insert in FIG. 13) attached to the frame 300 urge the frame 300 to return to the neutral position, as indicated by arrow 1305 in FIG. 13. However, as long as the water flow is sufficient to overcome the force of the counterweights 1303, the frame 300 remains in the collecting position. As noted with respect to FIG. 3, a counterweight attachment plate 360 is attached to the frame 300. FIG. 14 is a close-up perspective schematic illustration of the counterweight attachment plate 360. The counterweight attachment plate 360 defines a pair of slots 1400 and 1405. As shown in FIG. 15, counterweights 1303 are attached to the counterweight attachment plate 360 by bolts 1510 and 1515 extending through the counterweights 1303 and the slots 1400 and 1405. The slots 1400 and 1405 permit the positions of the counterweights 1303 to be adjusted, as indicated by arrow 1310 in the insert of FIG. 13, thereby adjusting the amount of torque about the pivot axis caused by the counterweights 1303 and, therefore, the speed with which the frame 300 returns to the neutral position. The counterweights 1303 are omitted from most of the drawings for clarity, i.e., so as not to obscure other features of the frame assembly 100, etc.

Returning to FIG. 12, when the water flow stops, the frame 300 automatically returns to the neutral position. Optionally, the frame 300 may be manually returned to the neutral position. In either case, the frame 300 may be releasably locked in the neutral position, as described above, such as to facilitate removal or replacement of full collection bags 700. The general E-shape of the frame 300 (FIG. 3) facilitates removing a collection bag 700, because the frame 300 surrounds only three sides of the bag, leaving a rearward-facing side open through which to remove the bag 700. Returning again to FIG. 12, while the frame is locked in the neutral position, such as during bag change out, the dam 365 prevents floating contaminants from bypassing the frame 300, even in the presence of water flow.

Figure 16:
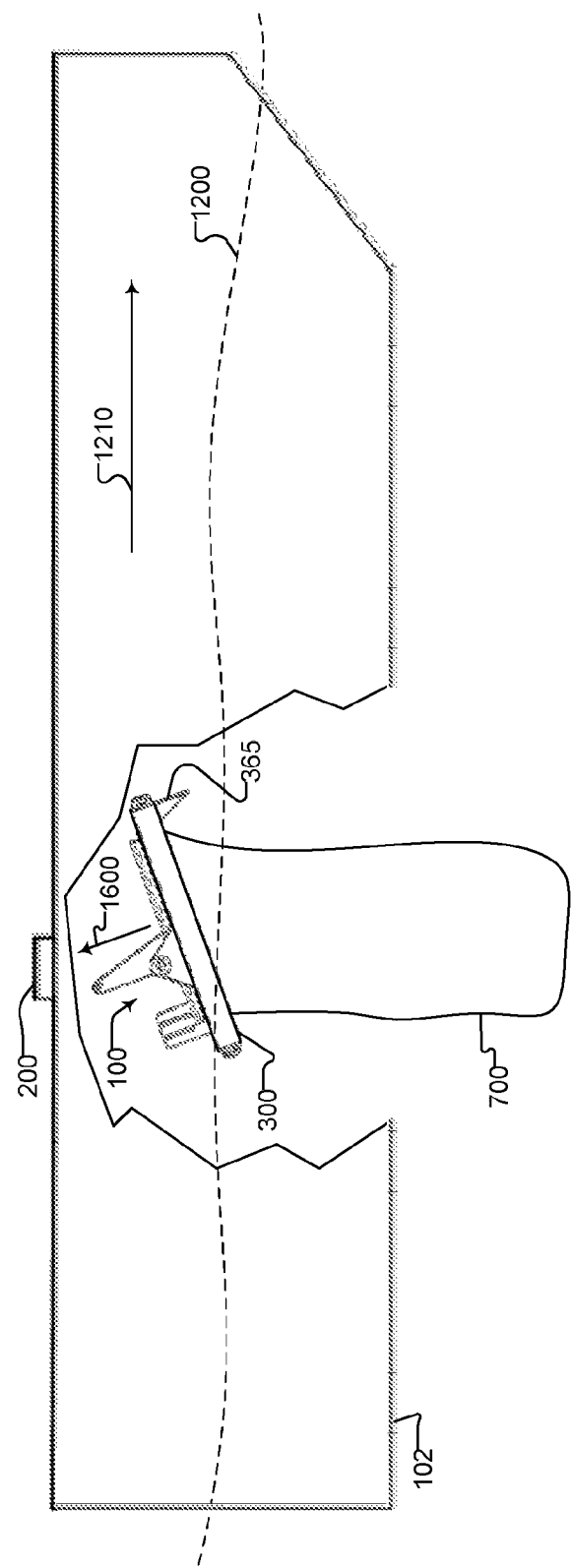
FIG. 16 is a cut-away side view of the catamaran of FIG. 11, with the frame shown in another neutral position, with a dam of the frame lifted above water level.

As noted with respect to FIG. 6, in some embodiments, the frame 300 can be releasably locked in a neutral orientation that positions the dam 365 out of the water, such as to facilitate moving the catamaran 102 over the water without the dam 365 creating drag. Such an orientation of the frame 300 is shown in FIG. 16. Note that the mouth of the collection bag 700 is directed (as indicated by arrow 1600) approximately upward, as that term is defined above, and the mouth of the collection bag 700 remains above the level 1200 of the water.

Figure 17:
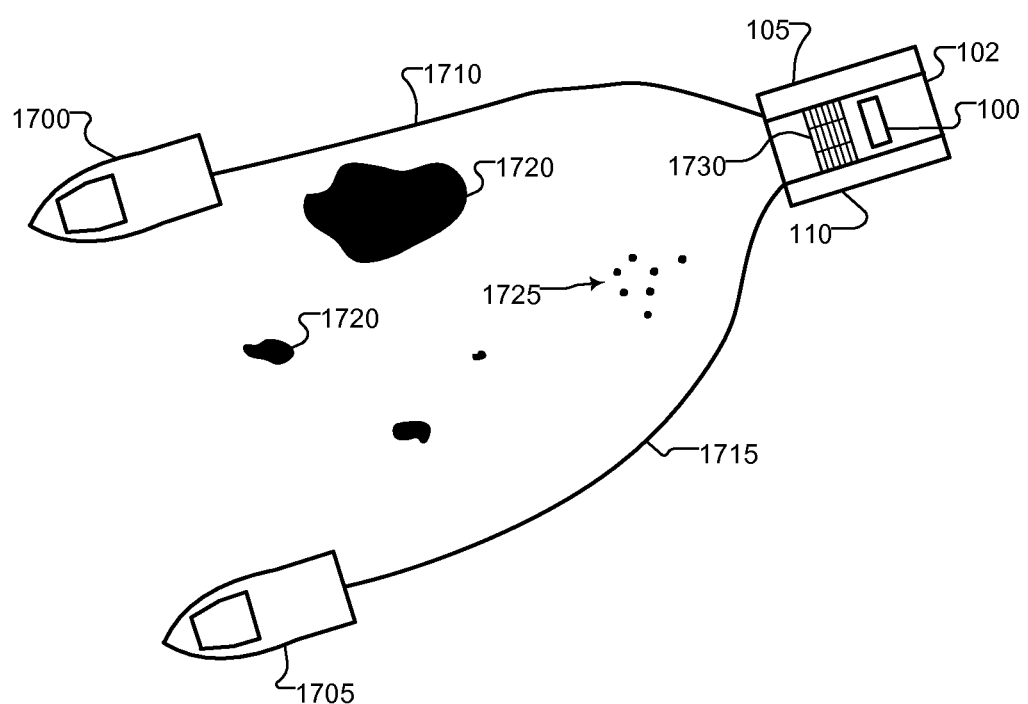
FIG. 17 is a top view schematic diagram of the frame assembly of FIG. 1 installed in a catamaran and in use, according to one embodiment of the present invention.

FIG. 17 is a top view schematic diagram of the frame assembly 100 in use, according to one embodiment. The frame assembly 100 is attached to the catamaran 102, as described above. Two powered vessels 1700 and 1705 tow the catamaran 102 via respective oil containment booms/towlines 1710 and 1715. Oil 1720, tar balls 1725 and other floating contaminants are corralled by the containment booms/towlines 1710 and 1715 and directed between the hulls 105 and 110 of the catamaran 102 and then through the frame 300 into a collection bag. The contaminants may float or be partially or fully submerged, as long as they are sufficiently close to the surface to be captured by the mouth of the collection bag, when the bag is in the collecting position.

Alternatively, the catamaran 102 may be pushed by a powered vessel, or the catamaran 102 may be self powered. In these cases, the containment booms/towlines 1710 and 1715 may be omitted.

Our experiments indicate that a speed of about 1 knot (water relative to the frame) is sufficient to cause the frame 300 to automatically transition from the neutral position into the collecting position, for our prototype frame assembly with collection bags attached thereto. Our experiments further indicate that the prototype frame assembly with collection bags remained in the collecting position and effectively collected floating material (tar balls) at least up to about 2.5 knots. With the frame 300 in the collecting position and collection bags attached thereto, the prototype was able to transit at least up to about 7 knots. The collection bags were observed to float freely, without creating notable additional drag or notably negatively impacting the speed of transit. Higher transit speeds may be achieved by locking the frame 300 in a neutral position in which the dam 365 is out of the water, as described above with reference to FIG. 16, and/or by removing the collection bags from the frame 300.

Optionally, the catamaran 102 may be equipped with a gangway 1730 suspended between the hulls 105 and 110 of the catamaran 102. The height of the gangway 1730 may be selected to be lower than the decks of the hulls 105 and 110, to facilitate access to the frame 300 and the bags attached thereto. In addition, a user may stand on the gangway 1730 or on the deck of one of the hulls 105 or 110 and look out for marine life, such as sea turtles, and divert the marine life, such as with a pole, to one side of the catamaran 102 or below it, so the marine life does not contact the frame assembly 100 or the collection bags.

Components of the frame assembly and of the catamaran may be fabricated from a non-corrosive metal, such as aluminum, stainless steel or another suitable material, giving consideration to the environment (such as fresh or salt water) in which they will be used and stresses (such as waves and towing/pushing) to which they will be subjected. Some of these components may be fabricated from, or include, suitable plastics or other suitable materials.

Although a generally E-shaped frame 300 (FIG. 3), a collection bag 700 (FIG. 7) having a generally rectangular shape and a generally rectilinear neck 800 (FIG. 8) that extends around three sides of the opening 332 or 333 defined by the frame 300 have been described, other shaped versions of these components may be used. For example, the neck may include two spaced-apart counterfacing C-shaped members, and the bag may have a generally round mouth. When such a bag is attached to such a neck, the resulting mouth shape resembles a circle or oval with truncated top and bottom. The frame may be suitably shaped to accommodate the neck shape.

Although a frame assembly 100 with a stop 350 (FIG. 3) has been described, as noted, the stop 350 may be omitted, which would permit the frame 300 to pivot among two oppositely-directed collecting positions and a neutral position between the two collecting positions. In this case, a second dam (not shown) may be included on the side of the frame 300 opposite the dam 365 (FIG. 3) to urge the frame 300 toward a second collecting orientation on the other side of the neutral position from the collecting position described above (ex., FIG. 4).

Although counterweights 1303 (FIG. 13) in the form of masses have been described, other types of counterweights may be used. In one alternative embodiment, a wound metal spring is attached between the U-shaped channel 115 (FIG. 4) and the arm 400 to urge the frame 300 toward the neutral position. The spring tension may be adjusted to adjust the amount of torque exerted on the frame 300. In another alternative embodiment, a gas spring urges the frame 300 to return to the neutral position.

While specific values chosen for some embodiments are recited, it is to be understood that, within the scope of the invention, the values of all of parameters may vary over wide ranges to suit different applications.

While the invention is described through the above-described exemplary embodiments, it will be understood by those of ordinary skill in the art that modifications to, and variations of the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiments.

What is claimed is:

1. A tilting skimmer for use with a collection bag defining a mouth configured to collect liquid borne material, the mouth having a perimeter, the liquid having a surface, the tilting skimmer comprising:
   a pivot; and
   a frame configured to:
      detachably receive the collection bag and orient the mouth of the collection bag consistent with orientation of the frame; and
      rotate about the pivot at least between first and second orientations of the frame, such that:
         in the first orientation of the frame, the perimeter of the mouth of the collection bag is above the surface of the liquid; and
         in the second orientation of the frame, the mouth of the collection bag is bisected by the surface of the liquid.

2. A tilting skimmer according to claim 1, further comprising a dam attached to the frame and configured to extend at least partially into the liquid when the frame is in the first orientation, such that flow of the liquid, relative to the frame and against the dam, urges the frame toward the second orientation.

3. A tilting skimmer according to claim 1, further comprising a counterweight attached to the frame and configured to urge the frame toward the first orientation.

4. A tilting skimmer according to claim 3, wherein the counterweight is adjustable.

5. A tilting skimmer according to claim 3, wherein the counterweight comprises a mass.

6. A tilting skimmer according to claim 3, wherein the counterweight comprises a mechanical spring.

7. A tilting skimmer according to claim 3, wherein the counterweight comprises a gas spring.

8. A tilting skimmer according to claim 1, further comprising a stop configured to prevent rotation of the frame about the pivot beyond the second orientation.

9. A tilting skimmer according to claim 1, further comprising a releasable lock configured to selectively prevent rotation of the frame about the pivot away from the first orientation.

10. A tilting skimmer according to claim 9, wherein the first orientation comprises a plurality of predefined first orientations of the frame and the releasable lock is configured to selectively prevent rotation of the frame about the pivot away from a selected one of the plurality of predefined first orientations of the frame.

11. A tilting skimmer according to claim 10, further comprising:
a dam attached to the frame and configured to extend at least partially into the liquid when the frame is in at least one of the plurality of predefined first orientation, such that flow of the liquid, relative to the frame and against the dam, urges the frame toward the second orientation; and
wherein in at least a different one of the plurality of predefined first orientations of the frame, the frame is oriented such that the dam is out of the liquid.

12. A tilting skimmer according to claim 1, wherein the frame comprises a neck extending proud of the frame.

13. A tilting skimmer according to claim 1, wherein the frame is configured to detachably receive at least two collection bags and orient respective mouths of the received at least two collection bags in parallel.

14. A tilting skimmer according to claim 1, further comprising at least two spaced-apart floats, the frame being disposed between the at least two floats and coupled to at least one of the at least two floats, the frame and the pivot being configured such that the frame rotates about the pivot, relative to the at least two floats.

15. A tilting skimmer according to claim 14, wherein the frame is reliably coupled to the at least one of the at least two floats.

16. A tilting skimmer for use with a collection bag defining a mouth configured to collect liquid borne material, the tilting skimmer comprising:
a pivot; and
a frame configured to:
detachably receive the collection bag and orient the mouth of the collection bag consistent with orientation of the frame; and
rotate about the pivot at least between first and second orientations of the frame, such that:
in the first orientation of the frame, the mouth of the collection bag is directed upward, within an angle of about 45 degrees of vertical; and
in the second orientation of the frame, the mouth of the collection bag is directed sideways, within an angle of about 45 degrees of horizontal.

17. A tilting skimmer according to claim 16, wherein the mouth of the collection bag has a perimeter and the liquid has a surface, and wherein:
the frame and the pivot are configured such that:
in the first orientation of the frame, the perimeter of the mouth of the collection bag is above the surface of the liquid; and
in the second orientation of the frame, the mouth of the collection bag is bisected by the surface of the liquid.

* * * * *